United States Patent [19]
Cave

[11] 4,156,799
[45] May 29, 1979

[54] AUTOMATIC DISCONNECT CIRCUIT

[75] Inventor: Ellis K. Cave, Garland, Tex.

[73] Assignee: Dycon International, Inc., Dallas, Tex.

[21] Appl. No.: 934,162

[22] Filed: Aug. 16, 1978

[51] Int. Cl.² .......................................... H04M 3/42
[52] U.S. Cl. .................................. 179/18 B; 179/6 R; 179/16 AA
[58] Field of Search ................... 179/18 B, 18 BE, 5.5

[56] References Cited

U.S. PATENT DOCUMENTS

| | | | |
|---|---|---|---|
| 3,428,756 | 2/1969 | Epstein | 179/5.5 X |
| 3,934,089 | 1/1976 | Stewart | 179/16 AA X |

Primary Examiner—William C. Cooper
Attorney, Agent, or Firm—Cook, Wetzel & Egan

[57] ABSTRACT

An automatic disconnect circuit is described for disconnecting a remote telephone in resonse to a hang-up click generated when the remote telephone goes on-hook. To distinguish a remote hang-up click from a local hang-up click, voice signals, and the like, all signals on the line are passed through a discriminator for attenuating high frequencies. Signals passing through the discriminator are sensed both as to their amplitude and their duration. Any such signal whose amplitude is too small results in no disconnect. Similarly, any such signal whose duration is atypical of a remote hang-up click results in no disconnect. Only a signal whose amplitude and duration are within predetermined limits, typical of a remote hang-up, causes the remote telephone to be disconnected.

9 Claims, 2 Drawing Figures

AUTOMATIC DISCONNECT CIRCUIT

BACKGROUND OF THE INVENTION

This invention relates generally to automatic disconnect systems for telephone circuits, and is particularly directed to a system for disconnecting a telephone circuit in response to a "hang up" by one party on a telephone line.

In the type of telephone system under consideration, a telephone line and intermediate switching circuitry couple a calling party's line to a called party's line. Generally, the system also includes means for detecting when one of the party's lines goes "on-hook" so that his telephone can be disconnected and made ready to receive or initiate further calls. Typically, the disconnect occurs approximately twenty seconds after the "on-hook" condition is detected.

Recently, apparatus for automatically recording messages from a caller and for transmitting recorded messages to a customer or client have been introduced. When a party is in communication with such apparatus, it is highly desirable that the customer's telephone line be quickly disconnected when he hangs up, i.e., goes "on-hook". For example, if the customer does not desire to hear the recorded message, he must have the ability to hang up and have his telephone freed or disconnected in order to make and receive further calls.

In the past, disconnect circuitry has typically sensed the hang-up click generated when a party hangs up, and based on that click, a disconnect was effected. Typical of such circuitry is that described in U.S. Pat. No. 3,676,605.

One of the assumptions that such prior art circuitry relied on was that the hang-up click was greater in amplitude than the voice signals. Thus, when a signal greater in amplitude than voice signals was sensed, that signal was used to trigger the disconnect. Of course, when a signal other than a hang-up click exceeded the expected amplitude of voice signals, the disconnect was improperly effected.

In modern telephone systems using electronic switching systems, the hang-up click is not invariably greater in amplitude than the voice signals. In fact, it is usually lower. Hence, amplitude discrimination alone is no longer effective for sensing a hang-up click.

Further, automatic message transmitting/receiving equipment is frequently used in connection with a local operator who initiates a call to a customer, places the apparatus on line with the customer, and then hangs up. Thus, the customer will be in communication with the automatic message transmitting equipment and the local operator is free to initiate another call.

Obviously, any hang-up click generated when the local operator hangs up must be distinguished from the hangup click of the customer. Otherwise, the customer's line would be disconnected when the local operator hangs up. The type of prior disconnect circuitry discussed above is generally not capable of reliably making that distinction.

OBJECTS OF THE INVENTION

Accordingly, it is an object of the invention to provide an improved disconnect system for use in telephone communications.

It is a more specific object of the invention to provide a disconnect system for use with automatic message transmitting/receiving apparatus.

BRIEF DESCRIPTION OF THE FIGURES

The above and other objects of the invention are more particularly set forth in the following detailed description and in the accompanying drawings of which.

SUMMARY OF THE INVENTION

The automatic disconnect circuit described herein disconnects a remote telephone when the remote telephone goes on-hook. The disconnect circuit includes a signal discriminator coupled to the telephone line for attenuating voice signals, high frequency components of noise signals, and the like. Clicks generated by a telephone going on-hook, and low frequency components of the DC level shift resulting from the local telephone going on-hook, both pass through the discriminator. A threshold detector generates a control signal whenever the magnigude of a signal from the discriminator exceeds a predetermined level. Hence, low amplitude signals are ignored. The control signal is received by a signal generator which senses the duration of the control signal and generates a disconnect signal only when the duration of the control signal is longer than a first predetermined interval and shorter than a second predetermined interval. A control signal generated in response to the DC level shift caused by the local telephone going on-hook is too long, i.e., beyond the second predetermined interval, and hence results in no disconnect signal. A control signal developed by a short duration or transient signal is shorter than the first predetermined interval and, hence, results in no disconnect signal. Only a control signal generated by a remote hang-up click has a duration greater than the first interval and shorter than the second interval. Accordingly, a disconnect signal is generated only in response to a hang-up click generated by the remote telephone going on-hook.

DESCRIPTION OF THE PREFERRED EMBODIMENT

The automatic disconnect circuit according to the invention may be used in a variety of applications. However, because it is particularly useful in a communication system wherein a remotely located telephone is placed in communication with a local automatic message transmitting/receiving apparatus, the invention is described below in terms of that environment.

Figure 1:
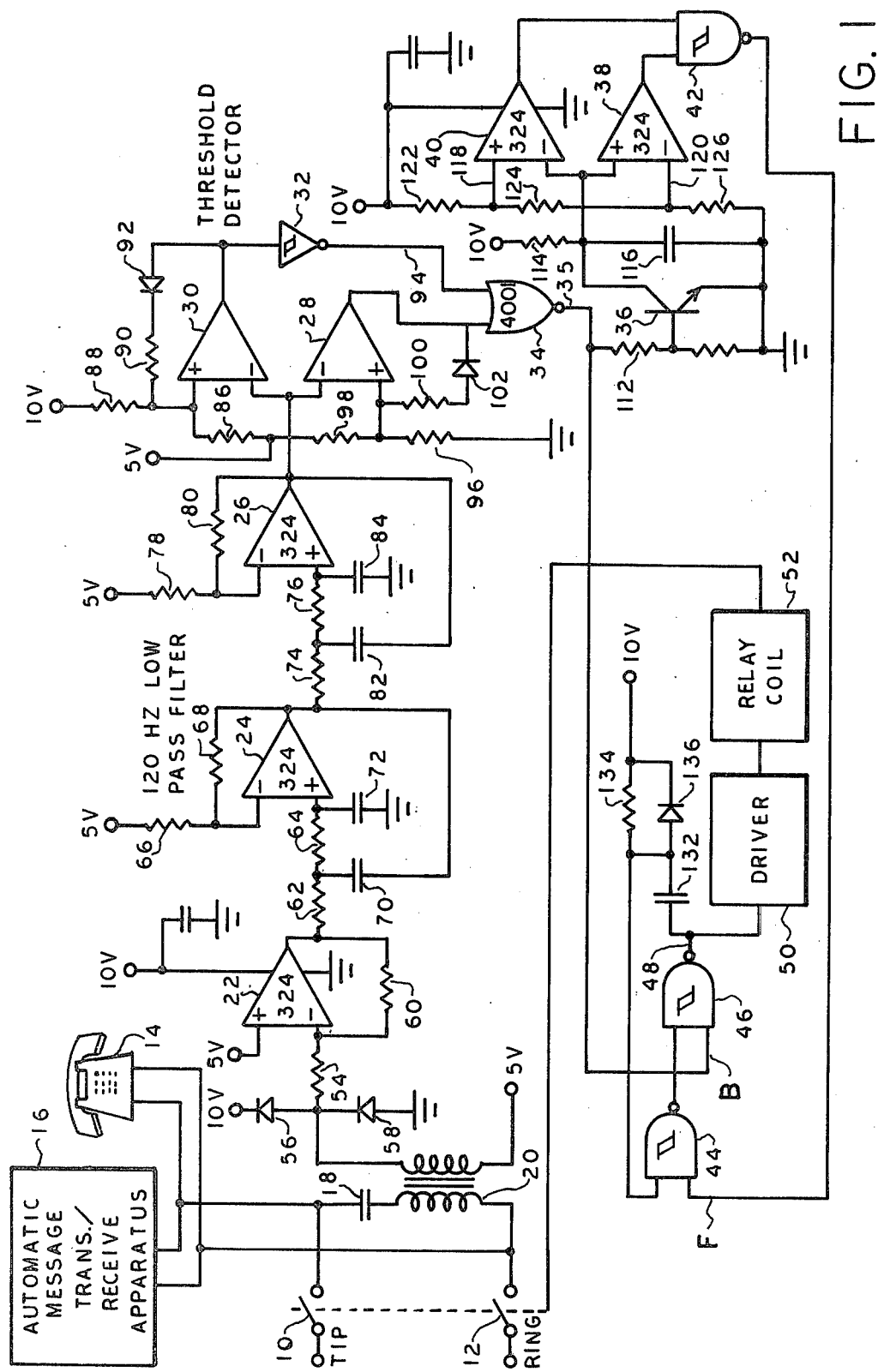
FIG. 1 is a schematic illustration of an automatic disconnect circuit according to the invention.

Referring now to FIG. 1, there is shown a detailed circuit diagram of a preferred embodiment of the automatic disconnect circuit of the invention. As illustrated, a telephone line having tip and ring lines is connected to a remote telephone (not shown) and, through a pair of relay-operated switches 10 and 12 to a local telephone 14 and an automatic message transmitting/receiving apparatus 16. Typically, an operator using the local telephone 14 may establish communication with another party at the remotely located telephone and inquire if that party desires to hear a message recorded on the apparatus 16. If the remote party assents to hearing the message, the local operator will activate the apparatus 16 for automatically transmitting the recorded message and then place the telephone 14 on-hook. Thereafter, the operator may again use the local telephone 14 to establish communication with yet another party while the apparatus 16 is transmitting its message to the first party.

Should the party who is in communication with the apparatus 16 place his remote telephone on-hook to terminate communication with the apparatus 16, it is desirable that the remote telephone be quickly disconnected so that it is free to make and receive further telephone calls. In other applications, such disconnect of a telephone has been effected by apparatus which senses the click which is generated when a telephone goes on-hook. However, in many applications, such as the one illustrated in FIG. 1, merely sensing the telephone click is not sufficient. For example, when the local operator places the local telephone 14 on-hook, a click is generated on the telephone line. However, if that click were used to disconnect the telephone line, the apparatus 16 would be disconnected improperly from the remote telephone. Hence, in the illustrated application and in other applications, the disconnect circuitry must ignore the click generated by the on-hook condition of the local telephone 14 but must quickly disconnect the telephone line, i.e., open the switches 10 and 12, when the remote telephone goes on-hook.

Before describing the operation of the automatic disconnect circuit herein, the effect of the local telephone 14 going on hook will first be described. Assuming that the switches 10 and 12 are open, a potential of approximately 50 volts will appear across the tip and ring lines. When the operator uses the local telephone 14 to establish communication with the remote telephone, the switches 10 and 12 close (by conventional apparatus not illustrated in FIG. 1) and the potential across the tip and ring lines drops to approximately 5 volts. When the called party answers the remote telephone, a click appears on the telephone line but no substantial DC level shift occurs across the tip and ring lines. When the local operator places the apparatus 16 on line, the potential across the tip and ring lines then drops to approximately 2.5 volts, and when the operator then places the local telephone 14 on-hook, the potential across the tip and ring lines rises to approximately 5 volts. The last mentioned change in potential must not be interpreted by the disconnect circuit as a hang-up click generated by the remote telephone. When the party then places his remotely located telephone on-hook, a click appears on the telephone line but the potential across the tip and ring lines stays at approximately 5 volts. With the above described DC level shifts in mind, the automatic disconnect circuit of the invention will now be described.

As shown, the tip and ring lines are coupled via a capacitor 18 and a transformer 20 into the first stage of the automatic disconnect circuit, that first stage being a signal discriminator comprising a buffer amplifier 22 and a pair of amplifiers 24 and 26 which are connected so as to form a low pass filter. The output of the low pass filter is fed to a threshold detector comprising a pair of comparators 28 and 30, an inverter 32, and a NOR gate 34. As is described in more detail below, the threshold detector generates at its output lead 35 a control signal whenever a hang-up click is sensed.

The output of the threshold detector is coupled into a disconnect signal generator which generates a signal for opening the switches 10 and 12 in response to a hang-up click generated by the remote telephone going on-hook. The threshold detector includes a transistor 36, a pair of comparators 38 and 40, and NAND gates 42, 44 and 46. The disconnect signal appears at the lead 48 coupled to the output of the NAND gate 46 and that signal is applied to a driver 50 for energizing a relay coil 52, the latter of which opens the switches 10 and 12 when the disconnect signal is generated.

Referring more specifically to the first stage of the automatic disconnect circuitry, the secondary of the transformer 20 is coupled via a resistor 54 to the input of the buffer amplifier 22. Diodes 56 and 58 are coupled as shown to the secondary of the transformer 20 to prevent large amplitude signals from overloading the buffer amplifier 22. A resistor 60 is coupled between the input and output of the amplifier 22 for setting the gain of the latter.

The output of the amplifier 22 is coupled via resistors 62 and 64 to the input of the amplifier 24, the latter of which is interconnected with the resistors 66 and 68 and capacitors 70 and 72 as shown to form a part of a low pass filter of conventional design.

The output of the amplifier 24 is coupled via resistors 74 and 76 to the input of the amplifier 26, the latter of which is connected as shown to resistors 78 and 80 and capacitors 82 and 84 to form the second half of the low pass filter. The illustrated resistors and capacitors which are connected to amplifiers 24 and 26 are selected to provide a 120 Hertz low pass filter. With this arrangement, the low pass filter substantially attenuates voice signals and high frequency components of noise, and yet passes the low frequency components attributable to the DC level shift which occurs when the local telephone 14 goes on-hook.

The output of the low pass filter is coupled to the inputs of the comparators 28, 30 for generating a control signal when the receipt of any signal from the low pass filter which is in excess of a predetermined magnitude. Referring to the comparator 30, it is coupled by resistor 86 to a 5 volt supply, and by a resistor 88 to a 10 volt supply. A resistor 90 and a diode 92 provides feedback from the output to the input of the comparator 30. With this arrangement, a quiescent bias of approximately $5\frac{1}{2}$ volts is applied to the positive terminal of the amplifier 30. When a signal from the low pass filter is approximately equal to $5\frac{1}{2}$ volts, the output of the comparator 30 goes low, thereby turning off the diode 92, whereupon the bias at the positive terminal of the comparator 30 drops to about 5.1 volts. As the signal at the negative input terminal of the comparator 30 declines in amplitude, it will eventually reach a 5.1 volt level, whereupon the output of the comparator 30 will then go high. The output of the comparator 30 is essentially a rectangular pulse type signal which goes from a normally high level to a normally low level and is converted by the inverter 32 to a positive-going pulse on the lead 94. Because of the hysteresis associated with the comparator 30, low level noise which is superimposed on a click or other signal which causes the comparator 30 to change states will have no effect on the status of the comparator 30. As a result, the output of the comparator 30 and that of the inverter 32 is a clean rectangular pulse whose duration corresponds to the duration of the incoming signal which caused the comparator 30 to change states.

Referring now to the comparator 28, its positive input terminal is coupled to ground via resistor 96 and to the 5 volt supply by resistors 98 and 86. A resistor 100 serially connected with a diode 102 couples the positive input to the output of the comparator 28. With this arrangement, the positive terminal of the comparator 38 is at a potential of approximately 4.5 volts and its output is low under that condition. When the negative input terminal of the comparator 28 receives a negative-going signal which is equal to or more negative than 4.5 volts, the output of the comparator 28 goes high, the diode 102 turns off, and the potential at the positive terminal of the comparator 28 rises to approximately 4.9 volts, at which point, the output of the comparator 28 again goes low. As with the comparator 30, the hysteresis built into the comparator 28 insures that low level noise superimposed on a click or other signal does not affect the status of the comparator 28.

Figure 2:
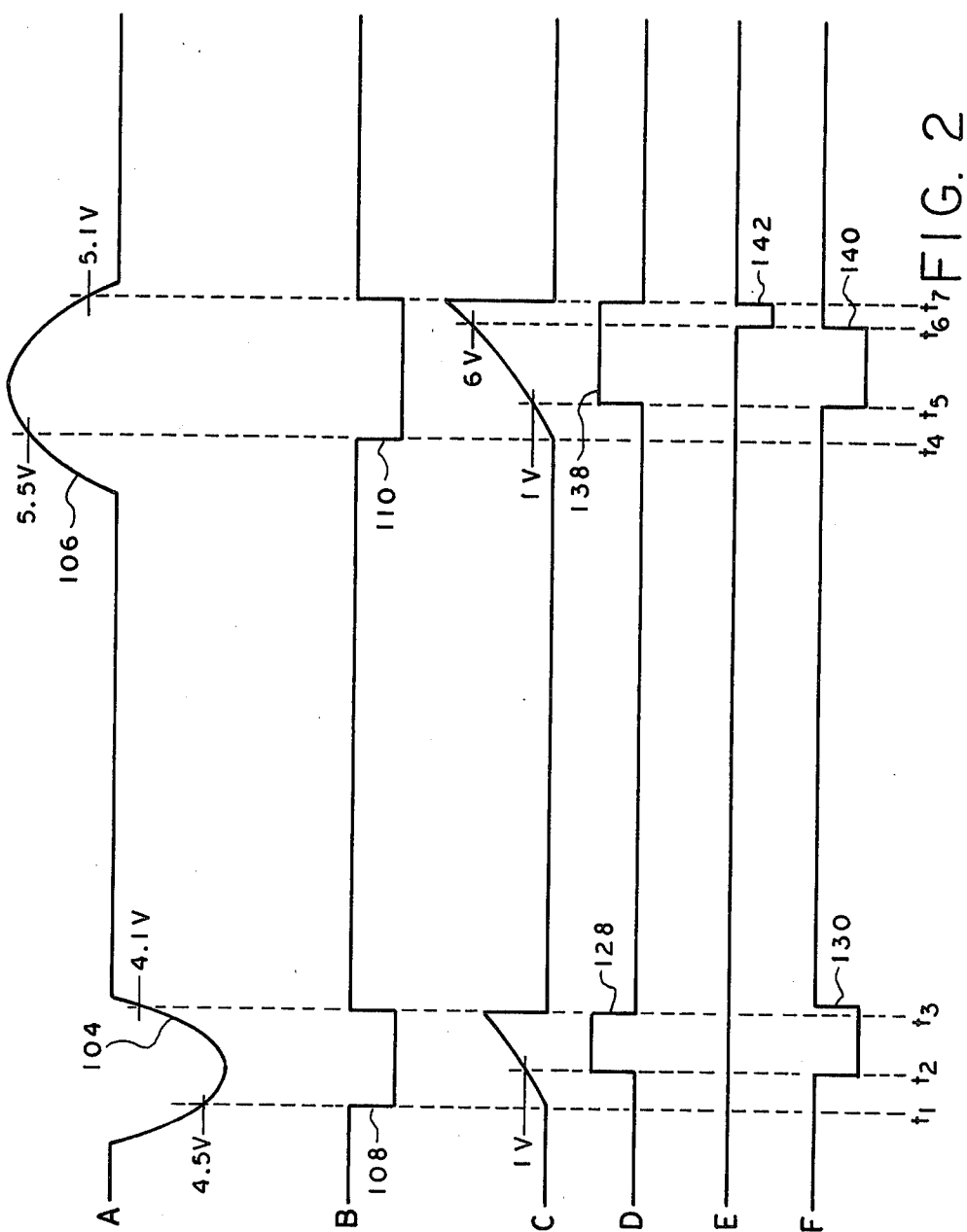
FIG. 2 illustrates various waveforms generated by the circuitry of FIG. 1.

The output of the inverter 32 and the output of the comparator 28 are each coupled to one input of a NOR gate 34. Hence, when either a positive-going or a negative-going signal from the low pass filter causes either of the comparators 28, 30 to change states, the output of the NOR gate 34 goes low. This output is designated herein as the "control signal" which appears on the lead 35 and which takes the form of a rectangular, negative-going pulse whose duration corresponds to that of a signal from the low pass filter. For example, waveform A of FIG. 2 illustrates a negative-going signal 104 and a positive-going signal 106, each of which are received by the threshold detector from the low pass filter. In response to these signals, control signals 108 and 110 (waveform B of FIG. 2) are developed. In the discussion below, it is assumed that the control signal 108 is developed in response to a click generated by the remote telephone going on-hook and the longer duration control signal 110 is developed in response to the click and DC level shift caused by the local telephone 14 going on-hook. Accordingly, only the control signal 108 will cause a disconnect signal to be generated.

Referring again to FIG. 1, control signals on the lead 35 are coupled through a resistor 112 to the base of the transistor 36 which is normally on. The collector of the transistor 36 is coupled to a 10 volt supply via a resistor 114 and to one side of a grounded capacitor 116. Hence, the capacitor 116 remains discharged while the transistor 36 is on.

The ungrounded side of the capacitor 116 is also coupled to the positive input terminal of the comparator 38 and to the negative input terminal of the comparator 40. The other input terminals 118, 120 of the comparators 40, 38 are coupled to reference voltages generated by the voltage divider comprising resistors 122, 124 and 126. In this example, the potential at the terminal 118 is approximately 6 volts and the potential at the terminal 120 is approximately 1 volt. The outputs of the comparators 38 and 40 are coupled to corresponding inputs of the NAND gate 42.

When a control signal is received by the transistor 36, the latter is turned off, whereupon the capacitor 116 charges toward 10 volts. Waveform C of FIG. 2 depicts the voltage across the capacitor 116. When that voltage reaches 1 volt (the reference potential at input terminal 120), the comparator 38 (whose output is normally low) generates a positive-going pulse 128 which starts at time $t_2$, as indicated by waveform D of FIG. 2. The pulse 128 continues as long as the control signal 108 continues, i.e., until time $t_3$, whereupon the capacitor 116 discharges (waveform C) and the pulse 138 terminates.

The comparator 40 normally has a high output. Hence, the combination of the pulse 128 and the high output of the comparator 40 cause the NAND gate 42 to generate a negative-going pulse 130 (waveform F of FIG. 2) at time $t_2$ and to continue the pulse 130 until shortly after time $t_3$. Because of the delay inherent in the discharge of the capacitor 116, the comparators 38 and 40, and the NAND gate 42, the pulse 130 continues for a short interval past time $t_3$. Because of the short duration of the control pulse 108, the voltage across the capacitor 116 does not reach 6 volts. Hence, the comparator 40 does not change states.

Referring to FIG. 1 again, the control signal (waveform B) is applied as an input to the NAND gate 46, and the output of the gate 42 (waveform F) is applied as one input to the NAND gate 44. The other input to the latter gate is coupled to the output of the gate 46 via a capacitor 132 and through a resistor 134 to a 10 volt supply. A diode 136 parallels the resistor 134.

Normally, the output of the gate 44 is low, and the output of the gate 46 is high. When the output of the gate 46 goes low, that change of status is treated as a disconnect signal, whereupon the driver 50 energizes the relay coil 52 for opening the switches 10 and 12.

In operation, the leading edge of waveform B is received by the gate 46 at time $t_1$, but this causes no change in the status of the gate 46, i.e., its output remains high. At time $t_2$, the gate 44 receives the leading edge of the waveform F, whereupon the output of the gate 44 goes from low to high. However, since waveform B is still low, the status of the gate 46 still does not change.

At time $t_3$, the waveform B goes high, the output of gate 44 is high (due to the fact that the waveform F is still low), and the gate 46 develops a low output, i.e., a disconnect signal. As described above, this causes the switches 10 and 12 to open for disconnecting the remote telephone.

In order to retain the output of the gate 46 at a low level long enough to open the switches 10 and 12, the negative-going disconnect signal is transiently coupled back to one input of the gate 44. Hence, the latter's output remains temporarily high and the output of the gate 46 is held low for a predetermined interval, dependent on the time constant associated with the capacitor 132.

To generate a disconnect signal as described above, the waveform F should continue at least as long, and preferably slightly longer, than the pulse 108. This condition will occur whenever a click is generated in response to the remote telephone going on-hook, but it will not occur when the local telephone 14 goes on-hook first.

Referring to FIG. 2, the control signal 110 is generated in response to the local telephone 14 going on-hook. This control signal is longer in duration than the control signal 108 because of the low frequency components of the DC level shift. Accordingly, the capacitor 116 charges for a longer interval and ultimately reaches (and exceeds) the 6 volt level (waveform C of FIG. 2) required to trigger the comparator 40.

As shown, the control signal 110 begins at time $t_4$ and the potential across the capacitor 116 reaches 1 volt at time $t_5$. At this point, the comparator 38 develops a pulse signal 138 and the NAND gate 42 generates a pulse signal 140.

At time $t_6$, the potential on the capacitor 116 reaches 6 volts and the comparator 40 generates a pulse signal 142. In response to the signal 142, the NAND gate 42 discontinues its pulse signal 140 (time $t_6$). The signals 110, 138 and 142 all continue until time $t_7$, but the signal 140 is shorted by the length of the interval $t_6$-$t_7$ during which the signal 142 is generated. Hence, the signal 140 is discontinued prior to the discontinuance of the control signal 110 and no disconnect signal is generated. This result can be appreciated by recalling that both inputs to the gate 46 must be high in order to generate the disconnect signal. That condition exists only when the control signal (waveform B) is discontinued (i.e., goes high), and waveform F is low. As indicated in FIG. 2, when the local telephone goes on-hook, the waveform F goes high before the control signal 110 discontinues. Accordingly, no disconnect signal is generated.

In order to ignore short noise pulses and the like, the system is designed to generate a disconnect signal only in response to a control signal which has at least a minimum duration. For example, FIG. 2 shows that the comparator 38 generates the control pulse 128 only at time $t_2$ in response to the voltage across the capacitor 116 reaching 1 volt. If the control signal terminates before the voltage on the capacitor 116 reaches 1 volt, the comparator 38 will not generate a pulse signal; nor will the gate 42. Hence, no disconnect signal will be generated. Thus, any output from the low pass filter must exceed a predetermined amplitude and continue for a predetermined interval ($t_1$–$t_2$) in order to generate a disconnect signal. The reference potential at the negative input terminal 120 of the comparator 38 is selected so that the latter changes state only after the minimum duration ($t_1$–$t_2$) of a control signal generated in response to the remote telephone going on-hook, typically about one millisecond.

In addition, and as indicated above, the control signal must discontinue prior to the time $t_6$ at which the comparator 40 changes state. Thus, the interval $t_4$–$t_6$ is selected to be shorter than the duration of a control signal generated in response to the DC level shift which occurs when the local telephone goes on-hook. That time is selected by the reference potential applied to the input 118 of the comparator 40. Thus, any control signal must have a duration of at least $t_1$–$t_2$ or $t_4$–$t_5$, and less than $t_4$–$t_6$ in order to generate a disconnect signal. Typically, the interval $t_4$–$t_6$ is about 10 milliseconds. Thus, a time "window" is established for discriminating between pulses responsive to remote hang-up on the one hand, and control pulses responsive to either local hang-up or short term transient signals on the other hand.

From another point of view, the signal generated by the NAND gate 42 may be thought of as a "window" signal which establishes a time "window" only during which a disconnect signal can be generated. If that window signal is too short (non-existant) or too long (longer than $t_6$), no disconnect signal will be generated. That is, the window signal is generated only when the control signal continues for the first, minimal interval ($t_1$–$t_2$ or $t_4$–$t_5$), and the window signal is discontinued on the first to occur of: (a) the control signal discontinuing (signal 108 at $t_3$) and (b) the control signal continuing for the second, maximum interval (signal 110 at $t_6$). Using this terminology, the disconnect signal is generated when the control signal discontinues, and then the window signal discontinues. Accordingly, control signals which are shorter than the minimum interval do not result in a "window" signal or a disconnect signal; control signals which are developed in response to the hang-up of a local telephone and which have a duration longer than the maximum interval result in the discontinuance of the window signal prior to the discontinuance of the control signal and do not, therefore, generate a disconnect signal.

The automatic disconnect circuit described above may be used in a variety of applications, but is particularly useful in connection with automatic message transmitting/receiving apparatus. It enables a local operator to initiate communication with a remote telephone, to transfer communication to the automatic message transmitting/receiving apparatus, and then to hang up without disconnecting the remote telephone. However, if the party using the remote telephone hangs up, his telephone is promptly disconnected, principally because the automatic disconnect circuit discerns the difference between a local hang-up and a remote hang-up. That same disconnect is not achieved by substituting for the disclosed window generator a bandpass filter to pass substantially only those frequencies generated by a hang-up click. Such a bandpass filter would attenuate the characteristics relied on by the automatic disconnect circuit to distinguish a local hang-up from a remote hang-up.

To enhance the effectiveness of the automatic disconnect circuit in certain environments, it may be desirable to "roll-off" the voice frequencies generated by the local telephone and/or those transmitted by a local automatic message transmitting/receiving apparatus to prevent low frequency components of voice signals from developing a disconnect signal. No such "roll off" is required for the remote telephone because the telephone line acts as a filter to remove such low frequency components.

Although the invention has been described in terms of a specific application and a preferred structure, it will be obvious to those skilled in the art that many alterations and modifications may be made without departing from the invention. Accordingly, all such modifications and alterations aredeemed to be within the spirit and scope of the invention as defined by the appended claims.

What is claimed is:

1. In a telephone communications systems in which a telephone line couples a remote telephone to a local telephone, and wherein a substantial D.C. level shift appears on the telephone line when the local telephone goes on-hook, an automatic disconnect circuit for disconnecting the remote telephone in response to the remote telephone going on-hook, comprising:
   signal discrimination means having an input coupled to the telephone line receiving the signals thereon, including voice signals and hang-up clicks generated by the remote and local telephones going on-hook, and adapted to substantially attenuate the voice signals and to pass the hang-up clicks to an output;
   comparator means coupled to the output of said signal discriminator means for generating a control signal in response to each signal which is received from said signal discrimination means and which has an amplitude in excess of a predetermined level;
   a disconnect signal generator responsive to control signals which have a duration greater than a first predetermined interval but less than a second predetermined interval for generating a disconnect signal, said first predetermined interval corresponding to the minimum duration of a control signal generated in response to the remote telephone going on-hook, and said second predetermined interval being shorter than the duration of a control signal generated in response to the D.C. level shift which occurs when the local telephone goes on-hook; and means receiving the disconnect signal for disconnecting the telephone line, whereby the attenuation of the voice signals inhibits the latter from generating a control or disconnect signal, signals having an amplitude less than the amplitude of a hang-up click fail to generate a disconnect signal, and said disconnect signal generator is insensitive to any signal on the telephone line generating a control signal whose duration is a typical of that generated by a remote hang-up click, thus preventing a control signal generated either by voice or a local hang-up from disconnecting the telephone line.

2. An automatic disconnect circuit as set forth in claim 1 wherein said comparator means generates a pulse-type control signal which starts only when a signal received by said comparator means has an amplitude greater than a predetermined level, and which control signal stops only when the amplitude of said received signal decreases by a given amount from said predetermined level, whereby said comparator means is substantially insensitive to noise which is superimposed on a hang-up click.

3. An automatic disconnect circuit as set forth in claim 1 and claim 2 wherein said comparator means is adapted to generate a control signal in response to a received signal having a positive excursion above a first predetermined level, and adapted to generate a control signal having a negative excursion below a second predetermin level, whereby a control signal is generated in response to either a positive-going hang-up click or a negative-going hang-up click.

4. An automatic disconnect signal as set forth in claim 1 wherein said signal discriminator means includes a low pass filter for attenuating voice signals and high frequency components of noise signals.

5. An automatic disconnect circuit as set forth in claim 1 wherein the control signal generated by said comparator means has a duration substantially corresponding to the duration of signals received from said signal discriminator means, wherein said disconnect signal generating means starts a window signal only when the control signal continues for said first predetermined interval, and discontinues the window signal upon the first to occur of:

(a) the control signal discontinuing, and (b) the control signal continuing for said second predetermined interval, and wherein said disconnect signal generator generates the disconnect signal only in response to the discontinuance of the control signal followed by the discontinuance of said window signal, whereby control signals which are shorter than said first predetermined interval do not result in a window signal or a disconnect signal, and control signals which are developed in response to the hang-up of a local telephone and which have a duration longer than said second predetermined interval result in the discontinuance of the window signal prior to the discontinuance of the control signal and do not, therefore, generate a disconnect signal.

6. An automatic disconnect circuit as set forth in claim 5 wherein said disconnect signal generating means includes:

a capacitor;

means for charging the capacitor during the continuance of the control signal for discharging said capacitor upon the discontinuance of the control signa;

a first comparator for generating a first output signal in response to the voltage on said capacitor exceeding a first potential and for discontinuing said first output signal in response to the discharge of said capacitor;

a second comparator for generating a second output signal in response to the voltage on said capacitor exceeding a second potential, and means receiving the outputs of said first and second comparators for starting the window signal in response to the generation of said first output signal and for discontinuing the window signal upon the first to occur of (a) the discontinuance of said first output signal, and (b) the generation of said second output signal, whereby the duration of said control signal exceeds the duration of the window signal when the duration of the control signal exceeds said second predetermined interval, thus inhibiting the generation of the disconnect signal when the control signal is of a duration greater than that of a hang-up click generated by the remote telephone going on-hook.

7. A automatic disconnect circuit as set forth in claim 5 wherein said disconnect signal generating means includes:

a first NAND gate having first and second inputs and an output, said first input receiving said window signal;

a second NAND gate having a first input coupled to the output of said first NAND gate, a second input receiving the control signal, and an output at which the disconnect signal is generated; and a capacitor coupling the output of said second NAND gate to the second input of said first NAND gate, whereby the discontinuance of the control signal followed by the discontinuance of said window signal results in the generation of the disconnect signal at the output of said second NAND gate, and said capacitor transiently couples a portion of the disconnect signal back to said first NAND gate to extend the duration of the disconnect signal.

8. In a telephone communication system in which a local operator estabishes communication between a local telephone and a remote telephone via a telephone line, and further establishes communication between the remote telephone and local automatic message transmitting/receiving apparatus, an automatic disconnect circuit which prevents disconnect of the telephone line when the local telephone by going on-hook creates a D.C. level shift on the telephone line, but disconnects the telephone line when the remote goes on-hook, comprising:

signal discrimination means having an input coupled to the telephone line for attenuating voice signals received therefrom and for passing to an output both the hang-up clicks generated by the remote telephone going on-hook, as well as the low frequency components of the D.C. level shift generated by the local telephone going on-hook;

comparator means coupled to the output of said signal discrimination means for generating a control signal in response to any signal which is received from said signal discrimination means and which has an amplitude exceeding a predetermined level;

a disconnect signal generator responsive to control signals which have a duration greater than a first predetermined interval but less than a second predetermined interval for generating a disconnect signal, said first predetermined interval corresponding to the minimum duration of a control signal generated in response to the remote telephone going on-hook, and said second predetermined interval being shorter than the duration of a control signal generated in response to the D.C. level shift which occurs when the local telephone goes on-hook; and means receiving the disconnect signal for disconnecting the telephone line, whereby the attenuation of the voice signals inhibits the latter from generating a control and disconnect signal, signals having an amplitude less than the said predetermined level fail to generate a disconnect signal, and said disconnect signal generator is insensitive to any signal on the telephone line generating a control signal whose duration is a typical of that generated by a remote hang-up click, thus preventing noise and local hang-up clicks from disconnecting the remote telephone from the automatic message transmitting/receiving apparatus, each disconnection being made only in response to a hang-up click generated by the remote telephone.

9. A disconnect circuit as set forth in claim 8 wherein said signal discrimination means includes a low pass filter for attenuating voice signals and high frequency components of noise signals.

* * * * *